US012786726B2

(12) United States Patent
Chaudhary et al.

(10) Patent No.: US 12,786,726 B2
(45) Date of Patent: Nov. 3, 2026

(54) KNOWLEDGE-BASED AUTHENTICATION LEVERAGING MOBILE DEVICES

(71) Applicant: Capital One Services, LLC, McLean, VA (US)

(72) Inventors: Viraj Chaudhary, Katy, TX (US); Zviad Aznaurashvili, Reston, VA (US); Samuel Rapowitz, Roswell, GA (US)

(73) Assignee: Capital One Services, LLC, McLean, VA (US)

( * ) Notice: Subject to any disclaimer, the term of this patent is extended or adjusted under 35 U.S.C. 154(b) by 1005 days.

(21) Appl. No.: 17/668,139

(22) Filed: Feb. 9, 2022

(65) Prior Publication Data

US 2023/0254699 A1 Aug. 10, 2023

(51) Int. Cl.

| | |
|---|---|
| ***H04W 12/72*** | (2021.01) |
| ***G06N 5/04*** | (2023.01) |
| ***G06V 10/70*** | (2022.01) |
| ***H04W 12/06*** | (2021.01) |

(52) U.S. Cl.

CPC ............ *H04W 12/72* (2021.01); *G06V 10/70* (2022.01); *H04W 12/06* (2013.01); *G06N 5/04* (2013.01)

(58) Field of Classification Search

CPC ...... H04W 12/72; H04W 12/06; G06V 10/70; G06N 5/04

See application file for complete search history.

(56) References Cited

U.S. PATENT DOCUMENTS

| | | | | |
|---|---|---|---|---|
| 9,356,968 | B1 | 5/2016 | Dotan et al. | |
| 10,157,504 | B1 * | 12/2018 | Jain | G06F 16/5838 |
| 10,164,974 | B2 | 12/2018 | Spencer et al. | |

(Continued)

FOREIGN PATENT DOCUMENTS

| | | | |
|---|---|---|---|
| GB | 2503292 A * | 12/2013 | H04W 4/029 |

OTHER PUBLICATIONS

Z. Le, X. Zhang and Z. Gao, "NemoAuth: A mnemonic multimodal approach to mobile user authentication, " 2013 IEEE International Conference of IEEE Region 10 (TENCON 2013), Xi'an, China, 2013, pp. 1-6, doi: 10.1109/TENCON.2013.6719039 (Year: 2013).*

*Primary Examiner* — Cesar B Paula
*Assistant Examiner* — Harrison C Kim
(74) *Attorney, Agent, or Firm* — Foley & Lardner LLP

(57) ABSTRACT

Systems, methods, and computer program products disclosed herein relate to knowledge-based authentication leveraging mobile-device photos and assets. In one embodiment, the system can identify, by employing a machine learning model, a plurality of authentication resources associated with a user, wherein the machine learning model is trained using historical information efficacy of authentication challenges. In another embodiment, the system can select a mobile-device photo and a mobile-device asset associated with the user from the plurality of authentication resources. In another embodiment, the system can select a synthetic photo consistent with the mobile-device photo. In another embodiment, the system can generate a challenge that includes the mobile-device photo, the mobile-device asset and the synthetic photo. In another embodiment, the system can authenticate with knowledge-based authentication based upon accuracy of a reply received in response to the challenge.

20 Claims, 10 Drawing Sheets

(56) References Cited

U.S. PATENT DOCUMENTS

| | | | |
|---|---|---|---|
| 10,332,261 | B1 | 6/2019 | Farivar et al. |
| 10,496,809 | B1 | 12/2019 | Pham et al. |
| 10,540,798 | B1 | 1/2020 | Walters et al. |
| 10,614,207 | B1 | 4/2020 | Truong et al. |
| 10,623,401 | B1 * | 4/2020 | Yager .................... H04L 67/12 |
| 10,872,344 | B2 | 12/2020 | Farivar et al. |
| 10,944,898 | B1 | 3/2021 | Farivar et al. |
| 11,032,585 | B2 | 6/2021 | Walters et al. |
| 11,182,468 | B1 | 11/2021 | Walters et al. |
| 2012/0214442 | A1 * | 8/2012 | Crawford ............. G06F 21/316 455/411 |
| 2012/0246079 | A1 | 9/2012 | Wilson et al. |
| 2013/0096819 | A1 * | 4/2013 | Tarnok ............... G01C 21/3844 701/538 |
| 2014/0189829 | A1 * | 7/2014 | McLachlan ........ G06Q 20/4014 726/6 |
| 2015/0381371 | A1 | 12/2015 | Liu |
| 2016/0125199 | A1 | 5/2016 | Lee et al. |
| 2017/0286768 | A1 | 10/2017 | Livesay et al. |
| 2017/0300679 | A1 | 10/2017 | Jaeh et al. |
| 2017/0318019 | A1 | 11/2017 | Gordon et al. |
| 2017/0337364 | A1 | 11/2017 | Whaley et al. |
| 2017/0346817 | A1 | 11/2017 | Gordon et al. |
| 2018/0059901 | A1 | 3/2018 | Gullicksen |
| 2018/0063138 | A1 * | 3/2018 | Rowden .................. G06F 21/53 |
| 2018/0181741 | A1 | 6/2018 | Whaley |
| 2018/0373859 | A1 | 12/2018 | Ganong et al. |
| 2019/0130168 | A1 | 5/2019 | Khitrov et al. |
| 2019/0245851 | A1 | 8/2019 | Whaley et al. |
| 2020/0042685 | A1 | 2/2020 | Tussy et al. |
| 2020/0151928 | A1 | 5/2020 | Hawker et al. |
| 2020/0226171 | A1 * | 7/2020 | Byrne .................. G06F 16/483 |
| 2020/0265080 | A1 * | 8/2020 | Fransen ............. G06Q 30/0251 |
| 2021/0004451 | A1 * | 1/2021 | Novik .................. H04W 12/06 |
| 2021/0056562 | A1 | 2/2021 | Hart et al. |
| 2021/0110396 | A1 | 4/2021 | Farivar et al. |
| 2021/0150469 | A1 * | 5/2021 | Miller ................ G06Q 10/0833 |
| 2021/0295422 | A1 * | 9/2021 | Periyathambi ...... G06F 18/2113 |
| 2021/0297422 | A1 * | 9/2021 | McDorman ........... H04L 63/107 |
| 2022/0191195 | A1 * | 6/2022 | Moros Ortiz ....... H04L 63/0861 |
| 2022/0292171 | A1 * | 9/2022 | Taher ...................... G06N 3/08 |

* cited by examiner

KNOWLEDGE-BASED AUTHENTICATION LEVERAGING MOBILE DEVICES

BACKGROUND

Knowledge-based authentication (KBA) is a method of identity verification based on knowledge of information associated with the claimed identity. KBA can be used as a step-up authentication, which is a method of re-authentication or adding extra layers of security upon requests to access sensitive information or resources within an application or service.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

The subject disclosure pertains to systems, methods, and computer program products disclosed herein relate to knowledge-based authentication leveraging mobile-device photos and assets. In an embodiment, a system is provided. The system can comprise a processor coupled to a memory that includes instructions that, when executed by the processor, can cause the processor to identify, by employing a machine learning model, a plurality of authentication resources associated with a user, wherein the machine learning model is trained using historical information efficacy of authentication challenges. The instructions can further cause the processor to select a mobile-device photo and a mobile-device asset associated with the user from the plurality of authentication resources. The instructions can further cause the processor to select a synthetic photo consistent with the mobile-device photo. The instructions can further cause the processor to generate a challenge that includes the mobile-device photo, the mobile-device asset and the synthetic photo. The instructions can further cause the processor to authenticate with knowledge-based authentication based upon accuracy of a reply received in response to the challenge.

In another embodiment, a computer-implemented method is provided. The computer-implemented method can comprise identifying, by a system operatively coupled to a processor, by employing a machine learning model, a plurality of authentication resources associated with a user, wherein the machine learning model is trained using historical information efficacy of authentication challenges, wherein the plurality of authentication resources includes mobile-device photos and mobile-device assets. The computer-implemented method can comprise selecting, by the system, from a mobile device the mobile-device photos, the mobile-device assets, and, from an outside source, synthetic photos consistent with the mobile-device photos. The computer-implemented method can comprise generating, by the system, a challenge that includes one of the mobile-device photos, one of the mobile-device assets and one of the synthetic photos. The computer-implemented method can comprise receiving, by the system a reply to the challenge. The computer-implemented method can comprise authenticating, by the system, the user using knowledge-based authentication based on the reply to the challenge regarding the one of the mobile-device photos, the one of the mobile-device assets, the one of the synthetic photos, or a combination thereof.

In another embodiment, a computer program product is provided. The computer program product can comprise a computer readable storage medium having program instructions embodied therewith. The program instructions can be executable by a processor to cause the processor to employ computer vision to select from one or more mobile devices mobile-device photos and mobile-device assets and from an outside source synthetic photos consistent with the mobile-device photos associated with a user. The program instructions can further be executable by the processor to cause the processor to generate a challenge that includes a subset of the mobile-device photos, a subset of the mobile device assets and a subset of the synthetic photos. The program instructions can further be executable by the processor to cause the processor to authenticate the user using a knowledge-based authentication based on a reply to the challenge regarding the subset of the mobile-device photos, the subset of the mobile-device assets, the subset of the synthetic photos, or a combination thereof. The program instructions can further be executable by the processor to cause the processor to generate a machine learning model based on efficacy of the knowledge-based authentication to improve subsequent selection of the mobile-device photos, the mobile-device assets, and the synthetic photos and to improve effectiveness of the challenge.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
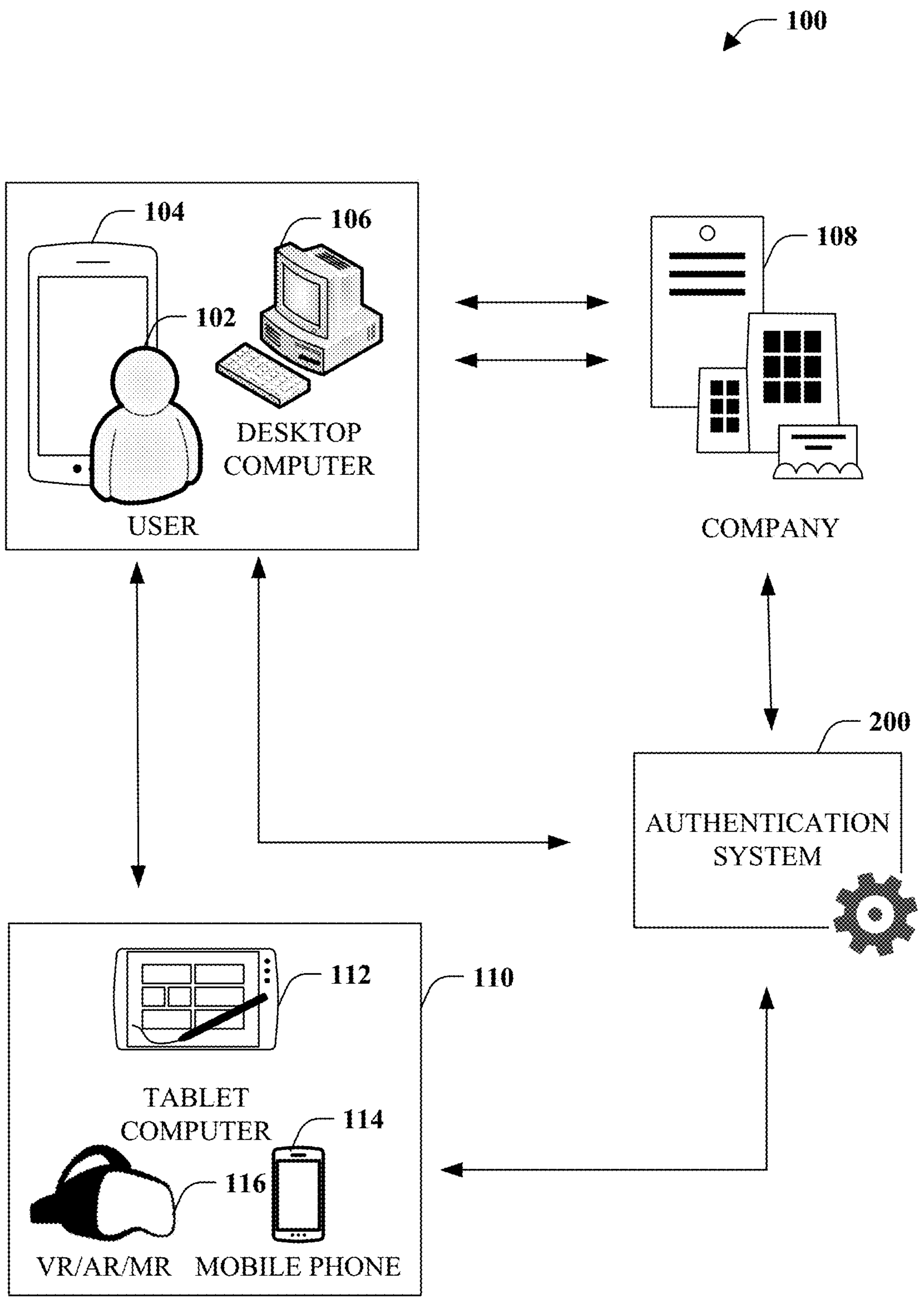
FIG. 1 illustrates an overview of an example implementation in accordance with one or more embodiments described herein.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Details disclosed herein generally pertain to knowledge-based authentication (KBA) leveraging mobile-device photos and assets. The KBA employed herein can be a step-up authentication that can be invoked to re-authenticate a user (e.g., customer) or to provide an additional layer of security upon requests by the user to access certain information or resources that may be considered sensitive. As used herein, the term "user" is used interchangeably with the term "customer" because a customer can also be a user of services, and vice versa.

There are two different paths for a user to get authenticated. One path can be for a call center authentication and another path is a digital one. In a call center authentication, a service agent (e.g., call center agent, customer service agent, customer service representative, etc.) can prompt sending the customer a link with KBA questions (e.g. challenges) via short message service (SMS) or email. The link can take the user through the same or similar KBA questions as provided with the digital path. In aspects, upon passing the KBA questions, an authentication token is sent to an agent case management system to allow the service agent to help the customer.

In other aspects, the digital path is initiated by the user via a mobile or web application. The user can log in a mobile or web application. Step-up authentication can be invoked upon login if the login is from an unknown device, unknown geographic location, or unknown internet protocol (IP) address. Step-up authentication can also be invoked upon request by the user to access information or resources that may be considered sensitive. For example, step-up authentication can be invoked upon requests to access more sensitive information or resources such as changing account information, transferring funds, or adding authorized users.

The authentication (e.g., step-up authentication) can comprise KBA questions (e.g., generally, questions) asking the user for information regarding their mobile-device photos or mobile-device assets. Upon invoking step-up authentication, the mobile or web application can request the user for permission to access photos and assets (e.g., other digital data) stored in the user's mobile devices. Assets stored in the user's mobile devices can comprise calendar events, alarm clock settings, songs, artists, or music albums. It is appreciated that assets stored in the user's mobile devices can include other digital data or digital assets. Photos stored in the user's mobile devices (e.g., mobile-device photos) can comprise graphics interchange formats (GIFs) or images (e.g., frames, photos, etc.) captured in a video. Mobile-device photos can also comprise images of recorded virtual reality, augmented reality, or mixed reality.

The mobile-device photos and the mobile-device assets (e.g., collectively, authentication resources) can be selected based on probability of memorability by the user determined based on number of interaction, recency, or significance of the mobile-device photos or the mobile-device assets. For example, photos that the user actively interact with would be more have a higher probability of memorability than photos that are not interacted with. Likewise, more recent photos or photos of important events having greater significance would also have a higher probability of memorability than less recent photos or photos with less significance. A similar concept is true of the mobile-device assets. For example, the user has a higher probability of remembering the names of the songs that are played more often or saved in their mobile devices than songs that are not played or not saved.

Computer vision can be employed to analyze visual data to select the mobile-device photos and synthetic photos (e.g., photos from sources other than the mobile devices associated with the user). Synthetic photos can comprise photos from online sources or photo libraries not associated with the user. For example, synthetic photos can be obtained from a photo library created or maintained by the company providing the user with services or another entity. Computer vision can be employed to select mobile-device photos and synthetic photos that have a predetermined quality. The synthetic photos can be selected (or generated) based on characteristics that are consistent with the mobile-device photos so that the synthetic photos look like they belong to the user. The mobile-device photos selected can exclude (e.g., leave out, not include, etc.) sensitive photos such as photos that a user might not want to make public. The mobile-device photos selected can exclude photos that are published on social media. Similarly, the synthetic photos selected from online sources can exclude common stock photos. In other aspects, synthetic photos can be generated based upon images from a user's mobile device or other associated store. These synthetic photos can appear very similar, but not identical to the user's images.

The KBA questions can include asking the user to select the mobile-device photos taken from the user's mobile devices among a combination of mobile-device photos and synthetic photos. The KBA questions can also include asking the user questions regarding their mobile-device assets such as selecting their alarm clock setting among common alarm clock settings. In some embodiments, a KBA question can reference both mobile-device photos and mobile-device assets. For example, a KBA question can ask the user the name of the song that was played at the time a photo was taken. The KBA questions can ask questions regarding mobile-device photos and mobile-device assets across different mobile devices associated with the user.

Referring to FIG. 1 to illustrate an overview of an example implementation 100 in accordance with one or more embodiments described herein. User 102 can be authenticated whether on mobile phone 104 speaking with a service agent for company 108 or accessing an online account with the company 108 via mobile phone 104 or desktop computer 106. KBA questions can be employed as a step-up authentication that can be invoked to re-authenticate the user 102 or to provide an extra layer of security upon requests for access to sensitive information or resources.

For sake of brevity, the mobile phone 104 and the desktop computer 106 are illustrated as non-limiting examples of different ways an account can be accessed by the user 102. However, it is appreciated that the user 102 can also use other electronic devices. The user 102 can utilize mobile phone 104 to call a service agent of the company 108 for assistance with the user 102's account. The service agent can send the user 102 a link via SMS or email containing KBA questions generated by the authentication system 200, as further described below in FIG. 2. It is contemplated that the service agent can also invoke the authentication system 200 to send the user 102 a link containing KBA questions. The user 102 can also use the mobile phone 104 or desktop computer 106 to directly access the user 102's online account with the company 108, wherein a step-up authentication comprising KBA questions, can be invoked for additional security. Upon passing the KBA questions, an authentication token can be sent back allowing access to the user 102's account.

The KBA question can leverage mobile devices 110. For example, the KBA questions can be directed to information regarding photos and digital assets in tablet computer 112, mobile phone 114 as well as mobile phone 104, and virtual reality/augmented reality/mixed reality device 116. It is appreciated that the mobile devices 110 are not limited to these types or number of devices as illustrated in FIG. 1. It is also appreciated that KBA questions can be generated based on photos and assets from multiple mobile devices, and the KBA questions can be accessed by the mobile phone 104 or the desktop computer 106.

Figure 2:
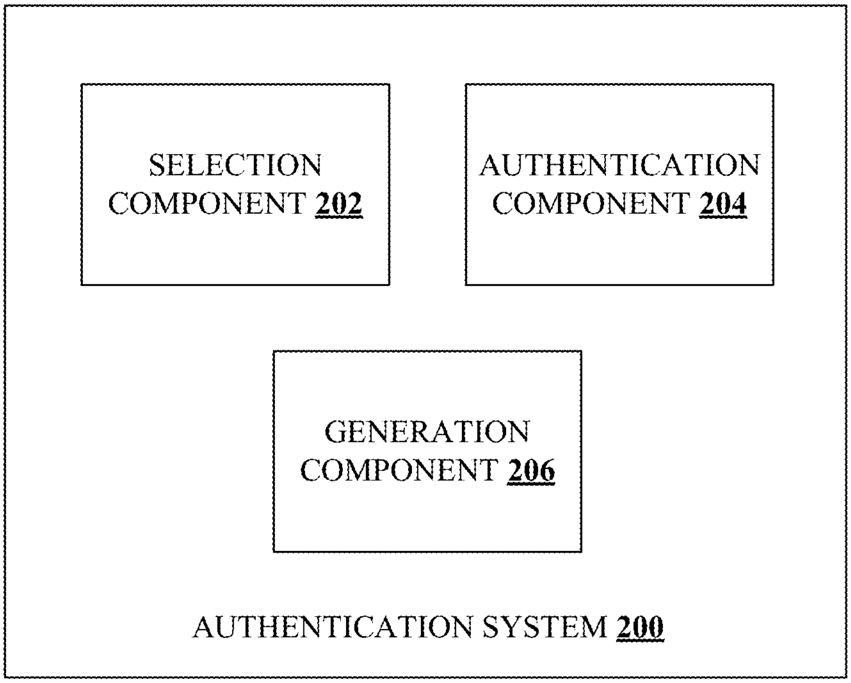
FIG. 2 illustrates a block diagram of an example, non-limiting authentication system in accordance with one or more embodiments described herein.

FIG. 2 illustrates a block diagram of an example, non-limiting authentication system 200 in accordance with one or more embodiments described herein. The authentication system 200 can comprise selection component 202, authentication component 204, and generation component 206. The selection component 202 can select from the mobile devices 110 and mobile phone 104 photos (e.g., mobile-device photos) and assets (e.g., mobile-device assets), as permitted by the user 102. The selection component 202 can also select synthetic photos, from an outside source not associated with the user 102 via the mobile devices 110 or the mobile phone 104, that are consistent with the mobile-device photos (e.g., photos from mobile devices 110 and mobile phone 104). The mobile-device photos (e.g., generally, photos) and the mobile-device assets (e.g., generally, assets or digital assets) can be selected based on probability of memorability by the user 102 determined based on different criteria. The photos and assets can be selected based on the number of interaction the user 102 has with those photos or assets, which can be a predetermined number of interactions. The photos and assets can also be selected based on how recent the photos or assets are created or interacted with. Additionally, the photos and assets can be selected based on their significance. For example, a photo taken at a special event can have a higher probability of memorability than a photo on taken on an ordinary day.

The mobile-device assets can comprise calendar events, alarm clock settings, songs, artists, or music albums. The mobile-device assets can also be images captured in a video. Additionally, the mobile-device assets can also be images of recorded virtual reality, augmented reality, or mixed reality. These mobile device assets can be cross referenced with the mobile-device photos for the bases of the KBA questions. For example, a KBA question can ask the user 102 to select the name of the calendar event based on a photo. It is contemplated that the KBA questions can be, but is not limited to, multiple choice questions.

The selection component 202 can employ computer vision to analyze visual data to select the mobile-device photos and the synthetic photos that have a predetermined quality, are consistent with the mobile-device photos, are not sensitive information, and are not published. Higher quality photos (e.g., mobile device photos and synthetic photos) can have higher significance and probability of memorability, and thus higher quality photos are selected for these reasons. For example, a blurry, accidental photo is not likely recognizable or remembered by the user 102. In asking the user 102 to select the photos that either the user took or saved on the mobile devices 110 or mobile phone 104 among the mobile-device photos and synthetic photos, this KBA question would be more difficult (e.g., has a higher level of security) if the synthetic photos are consistent with the mobile-device photos. If the attributes in the synthetic photos are consistent with the mobile-device photos, the KBA question would be more difficult to answer by an unauthorized user as there are little to no distinctions between the mobile-device photos and the synthetic photos. The attributes can be, but not limited to, similarity in quality of photo, style of photography (e.g, documentary, portrait, artistic, etc.), and geolocation.

Furthermore, computer vision can be also employed to avoid selecting sensitive photos that the user 102 may not want to be made public. In addition, computer vision can be employed to detect and select photos that are not published because published photos are widely known, thus, making the KBA questions easy and less secure. Computer vision can analyze visual data to detect photos which photos are published or not published. Published photos can be photos that are widely shared by the user 102 (e.g., via SMS or email) or have a high number of online views. The number of shares or views can be a predetermined number.

The authentication component 204 can authenticate the user using knowledge-based authentication based on questions regarding the mobile-device photos, the mobile-device assets, the synthetic photos, or a combination thereof, that are selected by the selection component 202. The knowledge-based authentication can be a step-up authentication that can be invoked based on a determination that the user is attempting to log in from an unknown device, unknown geographic location, or unknown internet protocol (IP) address. The step-up authentication can be invoked based on resources being accessed within an application or service, especially if there is a determination that the user 102 is attempting higher security access. For example, if the user 102 is attempting to change profile information, transfer funds, or add an authorized user, step-up authentication can be invoked for extra security measures.

The generation component 206 can improve efficacy of the authentication component 204. More specifically, the generation component 206 can generate a machine learning model based on efficacy of the knowledge-based authentication to improve selection of the mobile-device photos, the mobile-device assets, and the synthetic photos and to improve the questions, which in effect also improve efficacy of the authentication component 204. The machine learning model can comprise a neural network that is supervised or unsupervised and further comprise a feedback loop that feeds data back to the machine learning model as training data.

Figure 3:
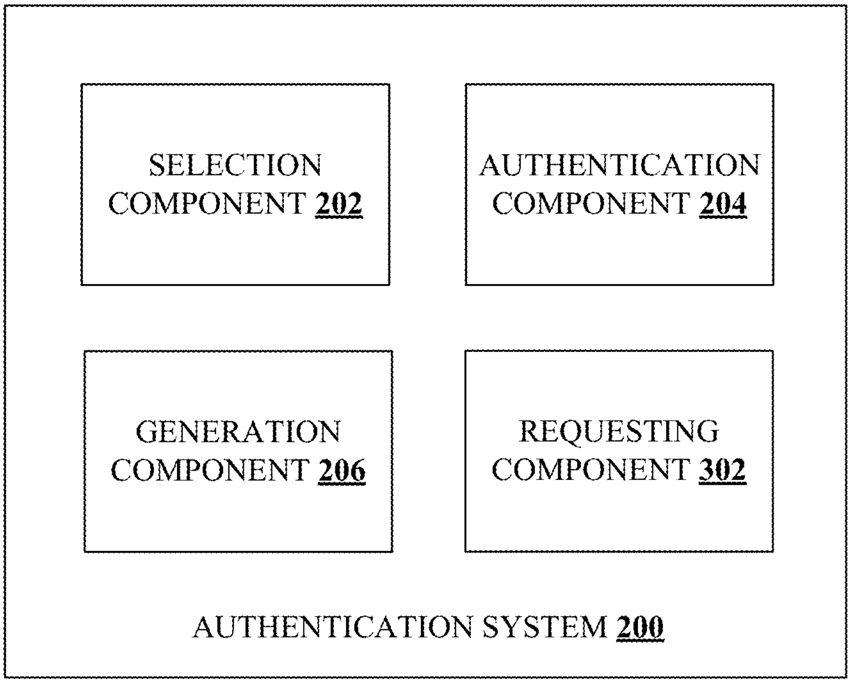
FIG. 3 illustrates a block diagram of another example, non-limiting authentication system in accordance with one or more embodiments described herein.

FIG. 3 illustrates a block diagram of another example, non-limiting authentication system 200 in accordance with one or more embodiments described herein. FIG. 3 illustrates that the authentication system 200 can further comprise requesting component 302. The requesting component 302 can request permission from the user 102 to access the mobile-device photos and the mobile-device assets on the one or more mobile devices (e.g., the mobile devices 110 and the mobile phone 104). The user 102 can authorize, deny, or limit access to the photos and assets. The user 102 can limit access to certain mobile devices, to certain photos albums, to certain assets.

Figure 4:
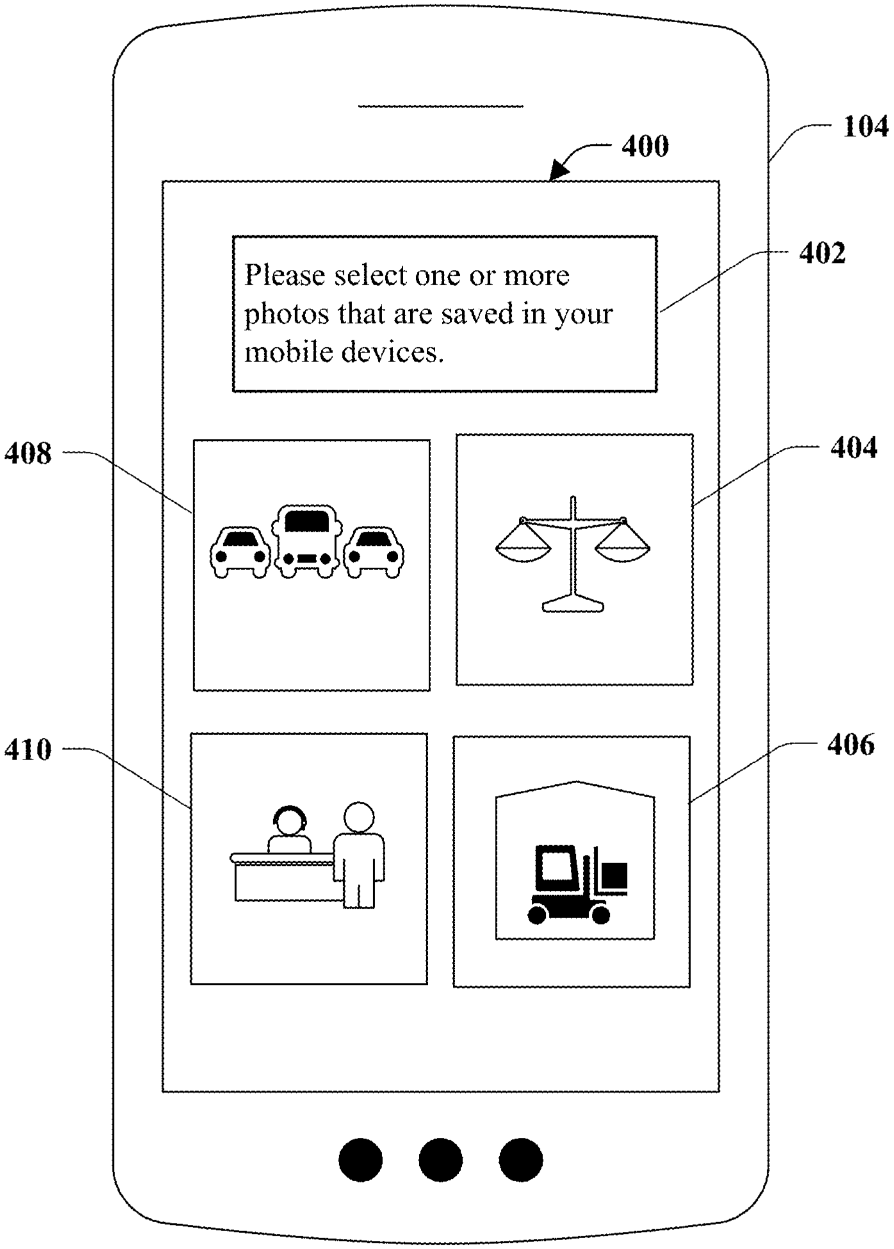
FIG. 4 is illustrates an example, non-limiting graphical user interface (GUI) in accordance with one or more embodiments described herein.

FIG. 4 illustrates an example, non-limiting graphical user interface (GUI) 400 in accordance with one or more embodiments described herein. The GUI 400 is on the mobile phone 104. However, the GUI 400 can be displayed on a different mobile device and have a different design. The GUI 400 shows KBA question 402 asking the user 102 to, "Please select one or more photos that are saved in your mobile devices." It is appreciated that the KBA question can be phrased differently. The user 102 can respond to the KBA question 402 by selecting (e.g., tapping on) among the photos 404, 406, 408, or 410 the photos that are saved in the mobile devices 110 or mobile phone 104.

Figure 5:
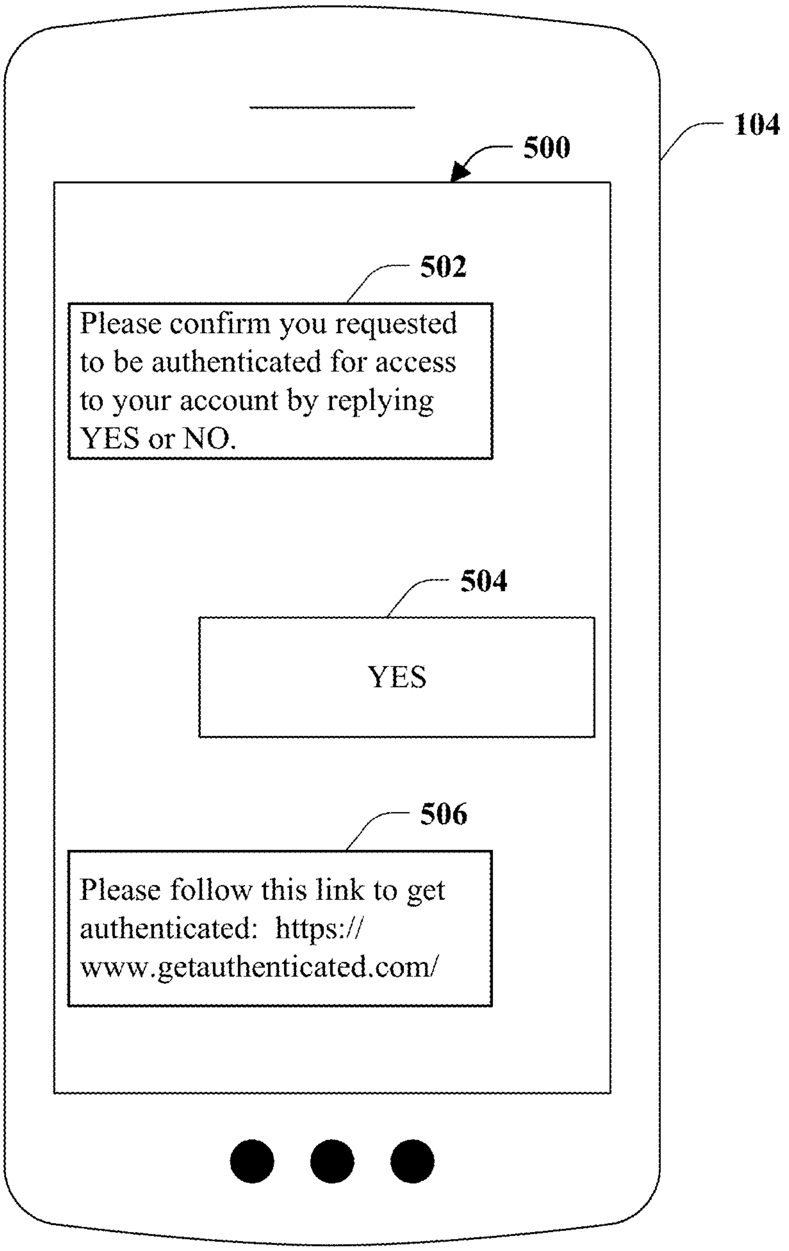
FIG. 5 illustrates another example, non-limiting GUI in accordance with one or more embodiments described herein.

FIG. 5 illustrates another example, non-limiting GUI 500 in accordance with one or more embodiments described herein. The GUI 500 illustrates an example implementation wherein the user 102 contacts the service agent of the company 108 requesting services. In order to provide the user 102 services, the service agent has to authenticate the user 102. A confirmation request 502 can be sent to the user 102 asking the user 102, such as to, "Please confirm you requested to be authenticated for access to your account by replying YES or NO." If the user 102 replies with a yes as in response 504, the message 506 can be sent to the user 102 with further authentication instructions. The authentication instructions in the message 506 can instruct the user 102 to select a link such as, for example, "Please follow this link to get authenticated: https//www.getauthenticated.com/." It is appreciated that a different GUI design and a different phrasing of the confirmation request 502 and the message 506 can be used.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers, . . . ). Such components, among others, can automate certain mechanisms or processes performed thereby, making portions of the systems and methods more adaptive as well as efficient and intelligent. By way of example, and not limitation, the generation component 206 can employ such mechanisms to improve selection of the mobile-device photos, the mobile-device assets, and the synthetic photos and to improve the questions (e.g., KBA questions).

With reference to FIGS. 6 through 9, example, non-limiting computer-implemented methods 600, 700, 800, and 900 are depicted. While, for purposes of simplicity of explanation, the methodologies shown herein, e.g., in the form of flow diagrams, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 6:
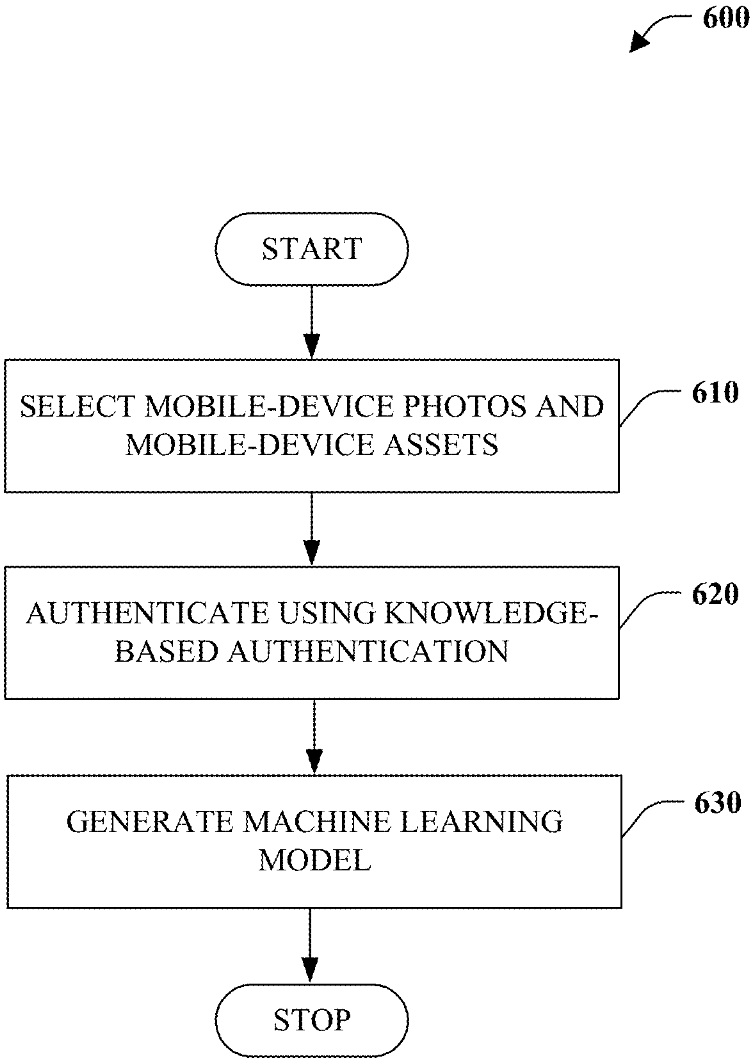
FIG. 6 illustrates a flow diagram of an example, non-limiting computer-implemented method in accordance with one or more embodiments described herein.

FIG. 6 illustrates a flow diagram of an example, non-limiting computer-implemented method 600 in accordance with one or more embodiments described herein. At 610, the computer-implemented method 600 can comprise selecting (e.g., via the selection component 202), by the authentication system 200 operatively coupled to a processor (e.g., processor(s) 1010), from one or more mobile devices associated with a user mobile-device photos and mobile-device assets, as permitted by the user, and from an outside source synthetic photos consistent with the mobile-device photos. At 620, the computer-implemented method 600 can comprise authenticating (e.g., via the authentication component 204), by the authentication system 200, the user using knowledge-based authentication based on questions regarding the mobile-device photos, the mobile-device assets, the synthetic photos, or a combination thereof. At 630, the computer-implemented method 600 can comprise generating (e.g., via the generation component 206), by the authentication system 200, a machine learning model based on efficacy of the knowledge-based authentication to improve selection of the mobile-device photos, the mobile-device assets, and the synthetic photos and to improve the questions.

Figure 7:
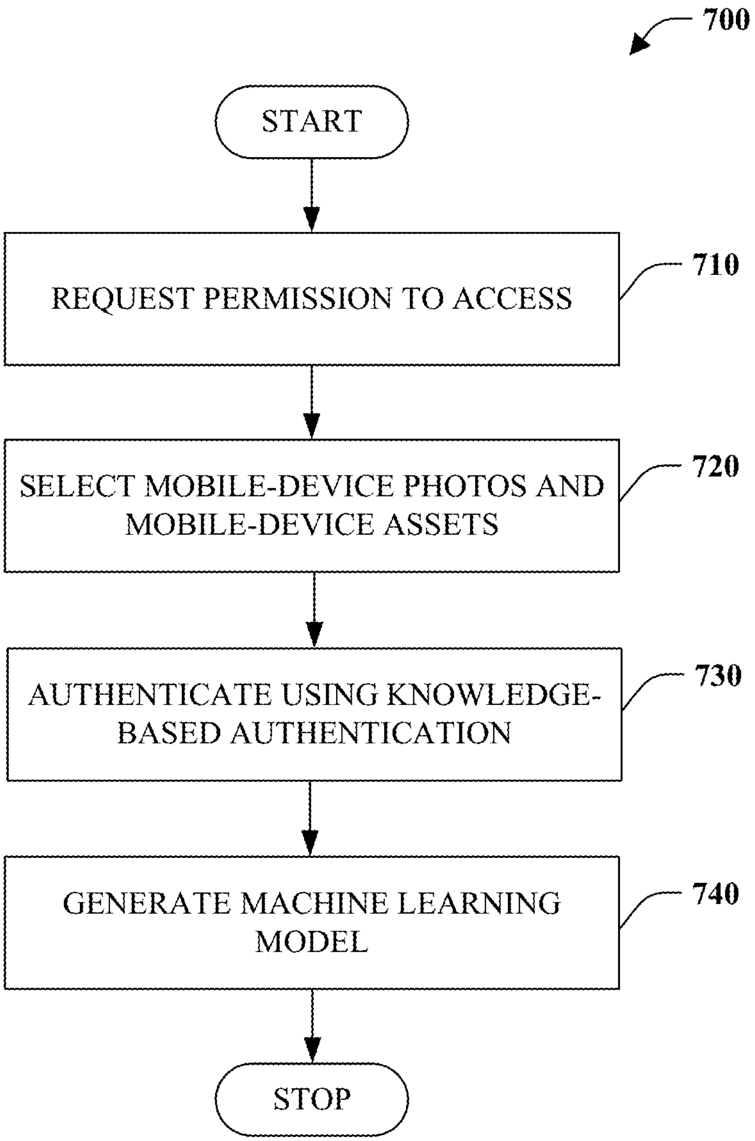
FIG. 7 illustrates another flow diagram of an example, non-limiting computer-implemented method in accordance with one or more embodiments described herein.

FIG. 7 illustrates another flow diagram of an example, non-limiting computer-implemented method 700 in accordance with one or more embodiments described herein. At 710, the computer-implemented method 700 can comprise requesting (e.g., via the requesting component 302), by the authentication system 200 operatively coupled to a processor (e.g., processor(s) 1010), permission to access mobile-device photos and mobile-device assets on one or more mobile devices associated with a user. At 720, the computer-implemented method 700 can comprise selecting (e.g., via the selection component 202), by the authentication system 200, from the one or more mobile devices the mobile-device photos and the mobile-device assets and from an outside source synthetic photos consistent with the device photos. At 730, the computer-implemented method 700 can comprise authenticating (e.g., via the authentication component 204), by the authentication system 200, the user using knowledge-based authentication based on questions regarding the mobile-device photos, the mobile-device assets, the synthetic photos, or a combination thereof. At 740, the computer-implemented method 700 can comprise generating (e.g., via the generation component 206), by the authentication system 200, a machine learning model based on efficacy of the knowledge-based authentication to improve selection of the mobile-device photos, the mobile-device assets, and the synthetic photos and to improve the questions.

Figure 8:
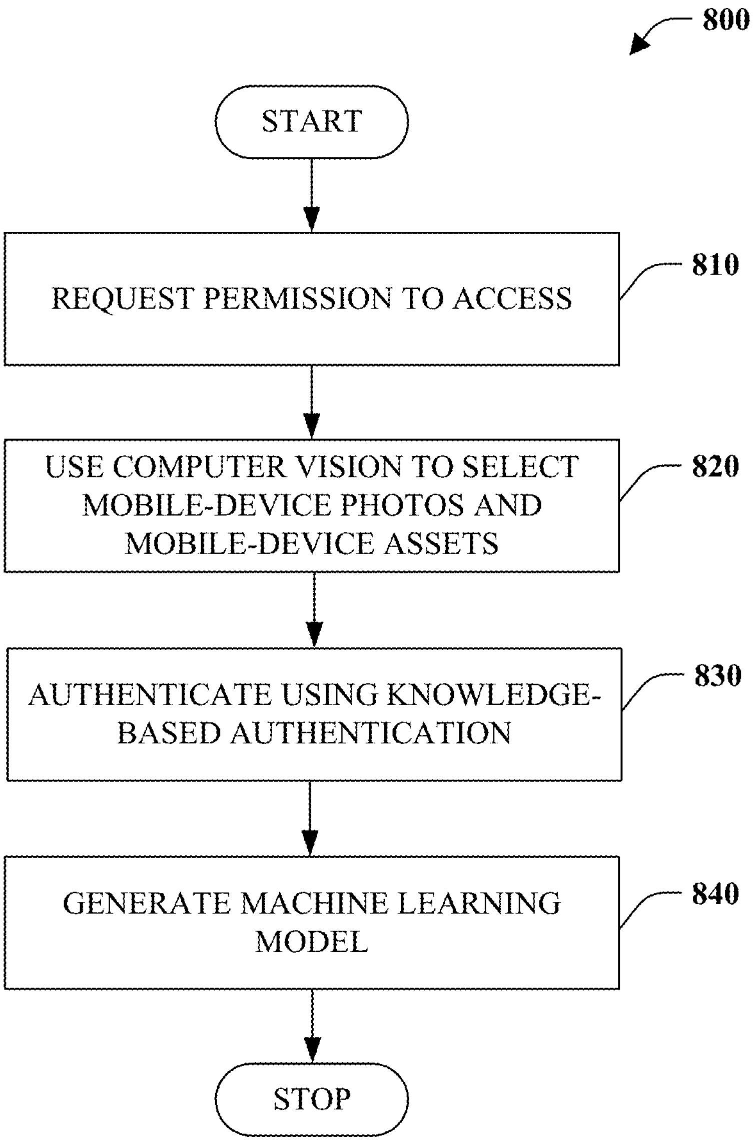
FIG. 8 illustrates another flow diagram of an example, non-limiting computer-implemented method in accordance with one or more embodiments described herein.

FIG. 8 illustrates another flow diagram of an example, non-limiting computer-implemented method 800 in accordance with one or more embodiments described herein. At 810, the computer-implemented method 800 can comprise requesting (e.g., via the requesting component 302), by the authentication system 200 operatively coupled to a processor (e.g., processor(s) 1010), permission to access mobile-device photos and mobile-device assets on one or more mobile devices associated with a user. At 820, the computer-implemented method 800 can comprise using (e.g., via the selection component 202), by the authentication system 200, computer vision to select from the one or more mobile devices the mobile-device photos and the mobile-device assets and from an outside source synthetic photos consistent with the mobile-device photos. At 830, the computer-implemented method 800 can comprise authenticating (e.g., via the authentication component 204), by the authentication system 200, the user using the knowledge-based authentication based on questions regarding the mobile-device photos, the mobile-device assets, the synthetic photos, or a combination thereof. At 840, the computer-implemented method 800 can comprise generating (e.g., via the generation component 206), by the authentication system 200, a machine learning model based on efficacy of the knowledge-based authentication to improve selection of the mobile-device photos, the mobile-device assets, and the synthetic photos and to improve the questions.

Figure 9:
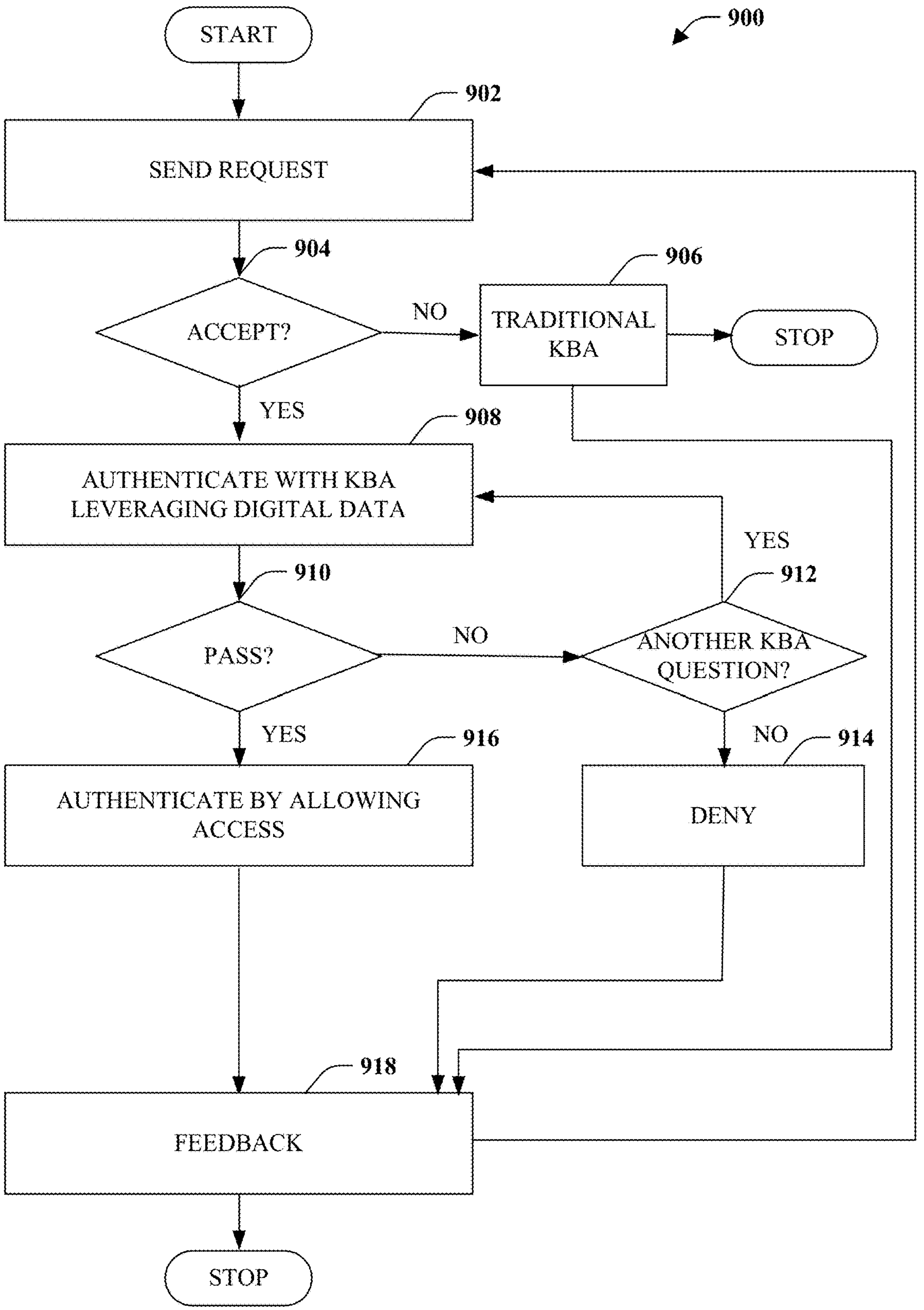
FIG. 9 illustrates another flow diagram of an example, non-limiting computer-implemented method in accordance with one or more embodiments described herein.

FIG. 9 illustrates another flow diagram of an example, non-limiting computer-implemented method 900 in accordance with one or more embodiments described herein. At 902, the computer-implemented method 900 can comprise requesting (e.g., via the requesting component 302), by the authentication system 200, permission to access the mobile-device photos and the mobile-device assets on the one or more mobile devices. At 904, the computer-implemented method 900 can comprise determining (e.g., via the requesting component 302), by the authentication system 200, whether the user 102 accepts the request for permission to access the mobile-device photos and the mobile-device assets. If the user does not accept, the process proceeds to 906. At 906, the computer-implemented method 900 can comprise authenticating (e.g., via the authentication component 204), by the authentication system 200, the user 102 using knowledge-based authentication based on traditional KBA questions not leveraging mobile device photos or assets.

If the determination at 904 is that the user does accept, the process continues to 908. At 908, the computer-implemented method 900 can comprise authenticating (e.g., via the authentication component 204), by the authentication system 200, the user 102 using the knowledge-based authentication based on questions regarding the mobile-device photos, the mobile-device assets, the synthetic photos, or a combination thereof.

At 910, the computer-implemented method 900 can comprise determining (e.g., via the authentication component 204), by the authentication system 200, whether the user passed the KBA questions (e.g., generally, questions). If the user does not pass the KBA questions, the process proceeds to 912. At 912, the computer-implemented method 900 can comprise determining (e.g., via the authentication component 204), by the authentication system 200, whether the user 102 should be asked another KBA question. This determination can be based on the difficulty of the KBA question asked. If the KBA question is determined to be unusually difficult, another KBA question may be asked. If the further question is to be asked, the process proceeds to 908. If the further question is not asked, the process continues to 914. At 914, the computer-implemented method 900 can comprise denying (e.g., via the authentication component 204), by the authentication system 200, authentication and access to the user 102.

If the determination at 910 is that the user answered a question correctly, the process continues to 916. At 916, the computer-implemented method 900 can comprise authenticating (e.g., via the authentication component 204), by the authentication system 200, the user 102 and allowing access to the user 102's account. At 918, the computer-implemented method 900 can comprise receiving (e.g., via the generation component 206), by the authentication system 200, feedback (e.g., from 906, 914, and 916) that can be used to generate and train machine learning models to improve selection of the mobile-device photos, the mobile-device assets, and the synthetic photos and to improve the KBA questions and traditional KBA questions. As a result, the efficacy of the knowledge-based authentication by the authentication component 204 can be improved.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
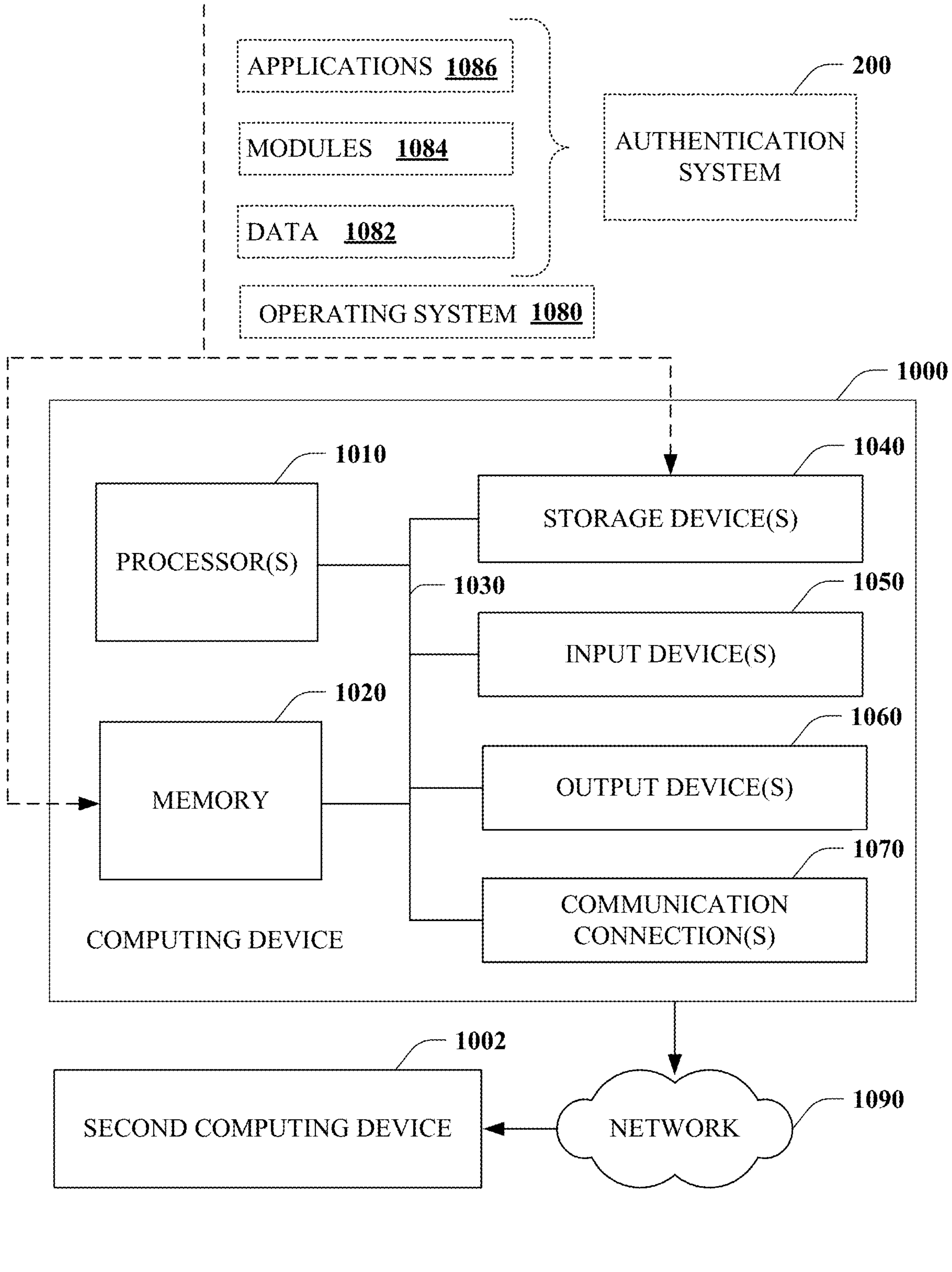
FIG. 10 is a block diagram illustrating a suitable operating environment for aspects of the subject disclosure.

To provide a context for the disclosed subject matter, FIG. 10, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network.

However, some, if not all aspects, of the disclosed subject matter can be practiced on stand-alone computers. In a distributed computing environment, program modules may be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node, . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer-executable actions, instructions, and or components stored in the memory 1020.

The processor(s) 1010 can be implemented with a general-purpose processor, a digital signal processor (DSP), an application-specific integrated circuit (ASIC), a field-programmable gate array (FPGA) or other programmable logic, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations concerning digital image processing and computer graphics.

The computing device 1000 can include or otherwise interact with a variety of computer-readable media to facilitate control of the computing device to implement one or more aspects of the disclosed subject matter. The computer-readable media can be any available media accessible to the computing device 1000 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 1000, such as during start-up, can be stored in non-volatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the authentication system 200 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the authentication system 200 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth, . . . ), or a combination thereof.

The computing device 1000 can also include communication connection(s) 1070 to enable communication with at least a second computing device 1002 utilizing a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. In one instance, the computing device 1000 can execute an authentication system 200 for a first function, and the second computing device 1002 can execute an authentication system 200 for a second function in a distributed processing environment. Further, the second computing device can provide a network-accessible service that stores source code, and encryption keys, among other things that can be employed by the authentication system 200 executing on the computing device 1000.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system for improving security of knowledge-based authentication by presenting authentication challenges (i) using a user's dynamic collection of mobile-device-stored assets and synthetic decoy images, thereby increasing authentication difficulty for non-authorized users without access to the user's mobile device and (ii) using a post-storage interactions threshold with the mobile-device-stored assets to facilitate authentication ease for the user, the system comprising:

one or more processors and memories comprising instructions that, when executed by the one or more processors, cause operations comprising:

in connection with a request for authenticating the user, presenting, via a user interface, a user prompt requesting permission to access one or more mobile-device assets on one or more mobile devices of the user;

based on (i) a user approval obtained via the user prompt and (ii) an output of a machine learning model, accessing, from a plurality of prestored mobile-device assets that are currently stored on the one or more mobile devices of the user, a mobile-device photo and a non-photo asset based on each of the mobile-device photo or the non-photo asset having a number of post-storage interaction by the user that meets or exceeds a threshold number of user interactions greater than user interactions with one or more other ones of the plurality of prestored mobile-device assets, wherein the machine learning model is trained using historical information efficacy of authentication challenges;

presenting, on a user interface, a challenge using (i) the mobile-device photo, (ii) the non-photo asset, and (iii) a synthetic photo appearing to be a photo belonging to the user and generated from the mobile-device photo, wherein presenting the challenge comprises:

using, as the non-photo asset, a calendar event of the plurality of prestored mobile-device assets for the challenge with the mobile-device photo based on a determination that the calendar event corresponds to the mobile-device photo;

using, as the non-photo asset, a music-related item of the plurality of prestored mobile-device assets for the challenge with the mobile-device photo based on a determination that the music-related item corresponds to the mobile-device photo; or using, as the non-photo asset, an alarm clock setting for the challenge with the mobile-device photo; and enabling access to a requested resource based upon accuracy of a reply received in response to the challenge.

2. The system of claim 1, wherein presenting the challenge comprises using the non-photo asset for the challenge with the mobile-device photo based on a determination that the non-photo asset corresponds to the mobile-device photo.

3. The system of claim 1, wherein presenting the challenge comprises using the non-photo asset for the challenge with the mobile-device photo based on a determination that a time of an event, associated with the non-photo asset, corresponds to the mobile-device photo.

4. The system of claim 1, wherein presenting the challenge comprises using the synthetic photo for the challenge with the mobile-device photo based on a determination that a geolocation associated with the synthetic photo corresponds to a geolocation of the mobile-device photo.

5. The system of claim 1, wherein presenting the challenge comprises using the calendar event of the plurality of prestored mobile-device assets for the challenge with the mobile-device photo based on a determination that the calendar event corresponds to the mobile-device photo.

6. The system of claim 1, wherein presenting the challenge comprises using the music-related item of the plurality of prestored mobile-device assets for the challenge with the mobile-device photo based on a determination that the music-related item corresponds to the mobile-device photo.

7. The system of claim 6, wherein presenting the challenge by using the music-related item comprises selecting a song of the plurality of prestored mobile-device assets for the challenge with the mobile-device photo based on a determination that the song was played at a time corresponding to capture time at which the mobile-device photo was captured.

8. The system of claim 1, wherein presenting the challenge comprises using the alarm clock setting for the challenge with the mobile-device photo.

9. The system of claim 1, wherein the synthetic photo is selected from an outside source comprising an online source or a photo library not associated with a mobile device of the user.

10. The system of claim 1, wherein the mobile-device photo comprises graphics interchange formats (GIFs) or images captured in a video.

11. A computer-implemented method for improving security of knowledge-based authentication by presenting authentication challenges using a user's dynamic collection of mobile-device-stored assets and synthetic images, the method comprising:

in connection with a request for authenticating the user, accessing, by one or more processors, a mobile-device photo and a non-photo asset from a plurality of prestored mobile-device assets that are stored on one or more mobile devices of the user at a time corresponding to the request;

generating, by one or more processors, one or more synthetic photos, wherein the one or more synthetic photos comprise a synthetic photo corresponding to the mobile-device photo;

presenting, by one or more processors, based on a determination that the non-photo asset corresponds to the mobile-device photo, a challenge using (i) the mobile-device photo, (ii) the non-photo asset, and (iii) the synthetic photo appearing to be a photo of the user and corresponding to the mobile-device photo, wherein presenting the challenge comprises:

using, as the non-photo asset, a calendar event of the plurality of prestored mobile-device assets for the challenge with the mobile-device photo based on a determination that the calendar event corresponds to the mobile-device photo;

using, as the non-photo asset, a music-related item of the plurality of prestored mobile-device assets for the challenge with the mobile-device photo based on a determination that the music-related item corresponds to the mobile-device photo; or using, as the non-photo asset, an alarm clock setting for the challenge with the mobile-device photo; and enabling, by one or more processors, access to a requested resource based on a reply to the challenge.

12. The computer-implemented method of claim 11, wherein accessing the mobile-device photo and the non-photo asset comprises accessing, from the plurality of prestored mobile-device assets that are stored on the one or more mobile devices of the user at the time corresponding to the request, the mobile-device photo and the non-photo asset based on the mobile-device photo or the non-photo asset having a number of post-storage interactions by the user that meets or exceeds a threshold number of user interactions.

13. The computer-implemented method of claim 11, wherein presenting the challenge comprises using the non-photo asset for the challenge with the mobile-device photo based on a determination that a time of an event, associated with the non-photo asset, corresponds to the mobile-device photo.

14. The computer-implemented method of claim 11, wherein presenting the challenge comprises using the calendar event of the plurality of prestored mobile-device assets for the challenge with the mobile-device photo based on a determination that the calendar event corresponds to the mobile-device photo.

15. The computer-implemented method of claim 11, wherein presenting the challenge comprises using the music-related item of the plurality of prestored mobile-device assets for the challenge with the mobile-device photo based on a determination that the music-related item corresponds to the mobile-device photo.

16. One or more non-transitory computer-readable media storing instructions that, when executed by one or more processors, cause operations, related to improving security of knowledge-based authentication by presenting authentication challenges using a user's dynamic collection of mobile-device-stored assets and synthetic images, comprising in connection with a request for authenticating the user, accessing a mobile-device photo and a non-photo asset from a plurality of prestored mobile-device assets that are stored on one or more mobile devices of the user at a time corresponding to the request;

generating one or more synthetic photos, wherein the one or more synthetic photos comprise a synthetic photo corresponding to the mobile-device photo;

presenting, on a user interface, a challenge using (i) the mobile-device photo, (ii) the non-photo asset, and (iii) the synthetic photo appearing to be a photo of an album on the one or more mobile devices and corresponding to the mobile-device photo, wherein presenting the challenge comprises:

using, as the non-photo asset, a calendar event of the plurality of prestored mobile-device assets for the challenge with the mobile-device photo based on a determination that the calendar event corresponds to the mobile-device photo;

using, as the non-photo asset, a music-related item of the plurality of prestored mobile-device assets for the challenge with the mobile-device photo based on a determination that the music-related item corresponds to the mobile-device photo; or using, as the non-photo asset, an alarm clock setting for the challenge with the mobile-device photo; and enabling access to a requested resource based on a reply to the challenge.

17. The one or more non-transitory computer-readable media of claim 16, wherein accessing the mobile-device photo and the non-photo asset comprises accessing, from the plurality of prestored mobile-device assets that are stored on the one or more mobile devices of the user at the time corresponding to the request, the mobile-device photo and the non-photo asset based on the mobile-device photo or the non-photo asset having a number of post-storage interactions by the user that meets or exceeds a threshold number of user interactions.

18. The one or more non-transitory computer-readable media of claim 16, wherein presenting the challenge comprises using the calendar event of the plurality of prestored mobile-device assets for the challenge with the mobile-device photo based on a determination that the calendar event corresponds to the mobile-device photo.

19. The one or more non-transitory computer-readable media of claim 16, wherein presenting the challenge comprises using the music-related item of the plurality of prestored mobile-device assets for the challenge with the mobile-device photo based on a determination that the music-related item corresponds to the mobile-device photo.

20. The one or more non-transitory computer-readable media of claim 16, wherein presenting the challenge comprises using the non-photo asset for the challenge with the mobile-device photo based on a determination that a time of an event, associated with the non-photo asset, corresponds to the mobile-device photo.

* * * * *